United States Patent
Plusquellic et al.

(10) Patent No.: US 12,212,551 B2
(45) Date of Patent: Jan. 28, 2025

(54) SYSTEM AND METHODS FOR PUF-BASED AUTHENTICATION

(71) Applicant: UNM Rainforest Innovations, Albuquerque, NM (US)

(72) Inventors: James Plusquellic, Albuquerque, NM (US); Derek Heeger, Vienna, VA (US)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 239 days.

(21) Appl. No.: 17/999,895

(22) PCT Filed: Jun. 2, 2021

(86) PCT No.: PCT/US2021/035362
§ 371 (c)(1),
(2) Date: Nov. 25, 2022

(87) PCT Pub. No.: WO2021/247646
PCT Pub. Date: Dec. 9, 2021

(65) Prior Publication Data
US 2023/0216838 A1    Jul. 6, 2023

Related U.S. Application Data

(60) Provisional application No. 63/033,403, filed on Jun. 2, 2020.

(51) Int. Cl.
*H04L 9/40* (2022.01)

(52) U.S. Cl.
CPC .................................. *H04L 63/08* (2013.01)

(58) Field of Classification Search
CPC ...................................................... H04L 63/08
USPC ............................................................. 726/7
See application file for complete search history.

(56) References Cited

U.S. PATENT DOCUMENTS

| | | | |
|---|---|---|---|
| 7,409,557 B2* | 8/2008 | Teppler | H04L 9/3231 |
| | | | 713/178 |
| 10,353,638 B2* | 7/2019 | Newell | G06F 21/79 |
| 11,303,462 B2* | 4/2022 | Cambou | H04L 63/0435 |
| 2017/0270288 A1 | 9/2017 | Walsh et al. | |
| 2017/0317889 A1* | 11/2017 | Moon | H04L 67/10 |
| 2018/0006813 A1 | 1/2018 | Van Der Leest et al. | |
| 2020/0313910 A1* | 10/2020 | Lindemann | H04L 9/3247 |
| 2023/0032099 A1* | 2/2023 | Zheng | H04L 9/14 |

* cited by examiner

*Primary Examiner* — Dant B Shaifer Harriman
(74) *Attorney, Agent, or Firm* — Valauskas Corder LLC (57) ABSTRACT

Authentication that leverages a Physical Unclonable Function (PUF) to generate bitstrings, session keys and long-lived keys (LLK).

20 Claims, 6 Drawing Sheets

SYSTEM AND METHODS FOR PUF-BASED AUTHENTICATION

CROSS-REFERENCE TO RELATED APPLICATIONS

This invention claims priority to U.S. Provisional Patent Application Ser. No. 63/033,403 filed Jun. 2, 2020.

FIELD OF THE INVENTION

The invention relates generally to an Internet of Things (IoT) environment. More specifically, the invention relates to security features including authentication protocols for use in resource constrained environments.

BACKGROUND OF THE INVENTION

The integration of IoT devices continues to expand into personal and industrial applications, including home automation, health care and agriculture. The resource constrained nature and unsupervised operating environment of IoT devices increases their vulnerability to adversarial attacks. Characteristics such as battery life, ease of use, size, and cost weigh heavily into the constraints associated with IoT system design, and directly impact the footprint and computational complexity of acceptable security solutions.

Adversaries can engage in a wide variety of attacks including packet sniffing of transmitted information, denial of service (DoS), man-in-the-middle, password guessing, impersonation, etc. Security functions including authentication, encryption, and secure key exchanges are the primary defense mechanisms against attacks.

Many techniques exist that implement these functions providing enhanced levels of security at the expense of additional computation and transmissions. Resource constrained embedded systems are often only able to leverage weaker security functions, making them less resilient to attacks.

The purpose of authentication is to verify the identity of an entity and to prevent impersonation by a malicious actor. A naïve form of authentication is to accept the claim to an identity in plain text form, i.e. "I am Bob". There is no evidence that Bob is who he claims he is and therefore, a malicious actor could easily make this same claim. A more secure form of authentication is based on Bob providing a password response to Alice, that requires Bob to have knowledge of a shared secret:

Bob: "I am Bob"
Alice: "What is your password?"
Bob: "Password is security1sFun55"

The problem with this scheme is that the password can only be used once securely, otherwise Alice is subject to a replay attack. This occurs when a malicious actor listens in on the first exchange and provides Bob's password on subsequent authentications. The most secure approach is based on a challenge-response protocol, where each challenge-response is used only once. Such a scheme proves knowledge of a shared secret and prevents a replay attack:

Bob: "I am Bob"
Alice: "What is password 123141?"
Bob: "Password is definitelySecureNow98"

A challenge-response form of authentication requires many shared secrets in practice or a one-way function that produces many responses to a single shared secret. The latter is provided by cryptographic primitives such as keyed secure hash functions. The former is possible if the device has a strong Physically Unclonable Function (PUF) which implies a large set of shared secrets.

There are two common mechanisms for establishing a shared secret(s) between Alice and Bob: (1) Through the use of public key infrastructure (PKI) and a trusted third party which allows devices to authenticate without any prior knowledge of each-other, and (2) Through a process called enrollment that is typically carried out in a secure facility immediately following device manufacturing, where each device produces secrets that are recorded in a secure database.

Mutual authentication is a process whereby two devices authenticate each other. The steps involved in mutually authenticating enrolled entities proceeds as follows:

Bob sends "Hello I am Bob" to Alice
Alice sends back a nonce: "Prove it with challenge number 1234567"
Bob combines the nonce with a shared secret to define a challenge and computes a response
Bob transmits his response to Alice "Here's my proof"
Alice carries out the same process with her copy of the shared secret and authenticates Bob if the two responses match.
Bob authenticates Alice in a similar fashion, i.e., by sending Alice a nonce, which she combines with her shared secret to define a new challenge, and then computes and transmits her response back to Bob.
Bob verifies her response with his own and mutually authenticates Alice if they match.

The encryption-based and secure hash mutual authentication schemes use a similar sequence of message exchanges. They differ primarily by how the challenge-response pair is constructed.

Authentication by secure hash generates the response from a challenge by concatenating the nonce with the secret and then performing a hash operation. A secure hash is a cryptographic primitive that transforms data through a one-way function into a digest. A one-way function implies that it is easy to compute the digest but extremely difficult to reverse the process, i.e., to compute the secure hash function input from the digest.

Common secure hash functions used for authentication include MD5, SHA-2, and SHA-3. MD5 was widely used in the late 1990's but later was found to possess security flaws and subsequently retired as a cryptographic function. It is used today only to detect unintentional data corruption. SHA-2 was released in the early 2000's and is based on the Merkle-Damgard structure. It replaced its predecessor, SHA-1, which was shown to have security vulnerabilities. Despite relying on the same mathematical principles, SHA-2 is still trusted and used in bitcoin, TLS, and SSL. The SHA-3 function is based on the Keccak algorithm which does not suffer from the same weaknesses as the Merkel-Damgard structure. The SHA-2 and SHA-3 functions have been standardized to generate digests of lengths 224, 256, 384, or 512 bits.

Hash algorithms leverage standard logic operations including XOR, AND, and NOT operations and can be readily implemented in a microcontroller, FPGA or application-specific integrated circuit (ASIC). ASICs represent the fastest and most energy efficient implementations and are commercially available.

The response to the challenge using the encryption method is simply the nonce encrypted with the secret key. The advanced encryption standard (AES) is commonly used as the encryption algorithm, with either 128- or 256-bit keys. This approach is referred to as AES-CMAC and can also be used to create message authentication codes (MACs). Encryption-based authentication can be implemented with other encryption techniques such as data encryption standard (DES) or Triple DES.

Encryption methods can be implemented in software or in hardware, e.g., ASICs. Some microcontrollers have built in AES modules. Alternatively, dedicated external AES hardware security modules can be added to the system architecture if desired.

The level of security provided by the authentication protocols vary, with some more vulnerable to attacks then others. The cryptographic methods rely on NVM which makes them vulnerable to invasive physical attacks. Secure NVM increases system costs further and cannot be used for lost cost IoT device applications.

For IoT devices, side-channel attacks are also of increasing concern, where adversaries attempt to steal internal secrets while the device carries out cryptographic operations by measuring and analyzing power transients or electromagnetic emissions. Protocols that utilize fixed-size, permanent keys are more vulnerable to side-channel attacks.

Battery backed random access memory (RAM) is an alternative, but requires periodic battery maintenance. PUFs offer a distinct advantage in this regard because the secret is no longer stored digitally in an NVM or on-chip. Moreover, a PUF is tamper-evident, i.e., they are easily destroyed by invasive probing attacks, further improving their attack resilience in the field.

A wide variety of PUF architectures have been proposed, including the Ring Oscillator, SRAM, and Arbiter PUFs. The terms strong PUF and weak PUF refer to distinct classes of PUFs characterized according to the number of unique bit strings they can generate. The number of bits produced by a strong PUF is a large exponential, typically greater than $2^{64}$, which enables them to serve both authentication and encryption key generation roles. Weak PUFs can only generate a small number of fixed size bit strings, and therefore are restricted to encryption key generation functions.

There are two basic strategies that have been proposed for using PUFs in authentication protocols: First, the PUF is used to generate an encryption key, which is used as the shared secret in the authentication techniques described above. A strong or weak PUF is applicable here because the shared secret is not revealed outside the device and can therefore be reused in multiple authentication operations. Second, the PUF is used to generate the challenge-response pairs directly, without the need for a shared secret or cryptographic primitive. The PUF receives the challenge, and then computes and transmits the response. Given a new challenge-response pair is needed for every authentication operation, this strategy requires a strong PUF. The second strategy provides a low power form of authentication, making the approach attractive for resource constrained devices.

Hence, PUF based authentication in resourced constrained environments is needed. The invention satisfies this need.

SUMMARY OF THE INVENTION

The invention is directed to Physically Unclonable Function (PUF) based authentication in resourced constrained environments. Specifically, the invention leverages a PUF to generate authentication bitstrings, session keys and long-lived keys (LLK).

Resource constrained environments include short range network communication technologies and long range, low power technologies. For example, short range network communication technologies include Bluetooth, WiFi, and Zigbee, while longer range, low-power wide-area network (LPWAN) technologies include NB-IoT, LoRa, Sigfox, and LTE-M.

Use of LoRa architecture is an emerging low-power wide-area network (LPWAN) technology used in IoT devices. LoRa architecture has a set of configurable settings that affect the bandwidth and transmission range. LoRa architecture are those that utilize a closed source protocol using chirped spread spectrum (CSS) optimized for long range communications with low power. The LoRa physical layer is highly configurable and includes parameters such as spreading factor (SF), error coding rates, bandwidth, and header types.

For IoT devices that transmit sensitive information, control sensitive equipment, or require extremely low power consumption, the invention is a better alternative because it provides high levels of security, provides resistance to invasive attacks and is energy efficient with respect to internal computation and RF transmission.

The invention is directed to PUF based authentication in the context of a strong PUF referred to as a Hardware-Embedded Delay PUF (HELP). HELP is designed with a large source of entropy to enable it to generate an exponential number of challenge-response pairs. HELP leverages variations in propagation delay as a source of randomness. Tolerances in the manufacturing process cause delay to vary along logic paths within microprocessors, FPGAs and ASICs. HELP measures the delay of paths within a functional unit, e.g., a multiplier, using a high precision timing engine and then processes the digitized representations of those delays into a random, unique and reproducible bit string or key. HELP can accept challenges and produce responses directly within authentication protocols, i.e., without the need to obscure the interface with cryptographic primitives as is true for most other PUB. Furthermore, PUF challenges are stored on the device at manufacturing time and do not need to be transmitted, saving lots of transmitted information.

According to the invention, an enrollment process and authentication protocol leverage a specialized key-encryption-key (KEK) mode of operation. KEK mode is normally used in secure boot processes, which require a stand-alone device to boot up securely without assistance from a remote server. To accomplish this, HELP utilizes challenges and helper data that are stored locally on the device. During enrollment, the manufacturing facility applies the challenges to the PUF embedded within the device, and the PUF generates the secret key for the first time. The internally generated key remains on the device and is used to encrypt boot images. In order to enable the PUF to regenerate the same key in the field, the PUF also produces helper data during enrollment. This is stored in a non-volatile-memory (NVM) on the device, along with the challenges. These challenges and helper data are used to regenerate the decryption key, possibly under adverse environmental conditions. The helper data enables the key generation process to avoid bit flip errors adding resilience.

The invention is directed to a lightweight protocol since the amount of transmitted information for authentication is minimal. For example, in one embodiment of the invention the challenge and response of the authentication operation can be done with 18 bytes. And repeated use of a stored secret does not occur.

According to the invention, the server attempts to authenticate the client (device). The server sends a nonce (random number) to the device. The device runs XMR and generates helper data. The helper data is sent to the server, not the response. In fact, the response is the nonce the server sent and is useless because it is revealed to the outside world. It is critical that the device generates helper data which is sent to the server to authenticate the device.

The server uses the device-generated helper data to direct the construction of a response using stored enrollment data. Here, the response is just the nonce the server sent to the device. If the original value sent to the device matches the version that is constructed using the helper data received from the device, then authentication succeeds.

According to one embodiment, the invention is directed to a method for authenticating devices. During an enrollment phase, server challenges are generated and stored in a database. The challenges are transmitted to a device and used by the device to obtain digitized timing data. The digitized timing data is transmitted from the device to the server and the server stores the digitized timing data in the database. During an authentication phase, challenges are selected by the server from the database and a nonce is generated. The server transmits to the device the challenges and the nonce. The device applies the challenges to a physically unclonable function (PUF) to obtain device timing data. The device encodes the nonce and generates a helper data bitstring using the device timing data. Encoding is performed by parsing the device timing data, searching for a match to bits of the nonce, one bit at a time, and continuing the searching step until the helper data bitstring is exhausted. Searching by the device further comprises not selecting weak bits and selecting an odd number of bits greater than or equal to a number bits (e.g., three consecutive strong bits) with a same value, and that also match a nonce bit. The device transmits to the server the helper data bitstring which encodes the nonce. The server searches for a match to the nonce by retrieving from the database the digitized timing data and decodes the helper data bitstring to authenticate the device. Decoding the helper data bitstring further comprises using the helper data bitstring to select device timing data from the database, constructing a nonce using the device generated helper data bitstring and the selected device timing data from the database, and counting a number of matching bits in the constructed nonce with those in the original nonce generated by the server. The nonce may be constructed using majority vote on sets of consecutive bits with odd cardinality and greater than or equal to 3. The method for authenticating device may be performed in a resource constrained environment such as a low-power wide-area network. The device is authenticated if the number of mismatching nonce bits is less than a threshold.

According to another embodiment, the invention is directed to a method for authenticating servers. During an authentication phase, a nonce is generated by a device and transmitted to a server. Server challenges are selected from a database and the server generates a helper data bitstring using device timing data retrieved from the database that encodes the nonce. Encoding further comprises parsing the device timing data from the database, searching for a match to bits of the nonce, one bit at a time, and continuing the searching step until the helper data bitstring fully encodes the nonce. Searching involves not selecting weak bits and selecting an odd number of bits greater than or equal to a number of bits with a same value such as three consecutive strong bits, and that also match a nonce bit. Challenges and the helper data bitstring are transmitted by the server to the device. The challenges are applied by the device to a physically unclonable function (PUF) to obtain reproduced device timing data. The device decodes the helper data bitstring to generate a nonce. Decoding further comprises using the helper data bitstring to select device generated timing data, constructing a nonce from the selected device timing data, and counting a number of matching bits in the constructed nonce with those in the original nonce. The nonce is constructed using majority vote on sets of consecutive bits with odd cardinality and greater than or equal to 3. The generated nonce is compared with the original nonce sent by the device to the server. The server is authenticated if the number of mismatching bits in the nonces is less than a threshold. The device is authenticated if the number of mismatching nonce bits is less than a threshold. The server generates a nonce and encodes it by generating a helper data bitstring, the server transmits the helper data bitstring to the device, the device decodes the nonce using the server generated helper data bitstring, and the device and server now share a secret (the nonce) that can be used as a session key.

According to an embodiment of the invention, a device generates a long-lived key-encryption-key (KEK). During an enrollment phase, a server generates challenges and transmits them to a device. The device uses the challenges to obtain digitized timing data. The device generates a KEK or a nonce that will serve as the KEK. Generating the KEK or the nonce further comprises applying by the device the challenges to a physically unclonable function (PUF) to obtain device timing data, generating KEK bits, one at a time, by not selecting weak bits and selecting an odd number of bits greater than or equal to three consecutive strong bits with the same value, simultaneously generating a helper data bitstring that records results of the selecting process, and storing the challenges and the help data bitstring in a non-volatile-memory (NVM). The odd number of bits selected also match a bit of the nonce. Also, the KEK bit may be used as the value of a first strong bit in a sequence. During a regeneration phase, the device reads the challenges and helper data bitstring from the NVM. Challenges are applied by the device to a physically unclonable function (PUF) of the device to obtain device reproduced timing data. The KEK is generated wherein the KEK regeneration step further comprises using the device helper data bitstring to select timing values from the reproduced device timing values, constructing the bitstring from the selected timing values using majority vote on sets of consecutive bits with odd cardinality and greater than or equal to three, using the constructed bitstring as the KEK.

These and other exemplary features and advantages of the present invention will become clear from the following description with reference to the accompanying drawings.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the presented detailed description. The description and accompanying drawings may highlight a certain specific example, or a certain aspect of the invention. However, one skilled in the art will understand that portions of the example or aspect may be used in combination with other examples or aspects of the invention.

DETAILED DESCRIPTION OF THE INVENTION

The invention is directed to an IoT authentication protocol that minimizes the amount of transmitted information between the device and server by leveraging a Physical Unclonable Function (PUF) to generate authentication bitstrings, session keys and long-lived keys (LLK).

The protocol leverages previous disclosed XMR reliability enhancement method, where an odd number of multiple strong bits generated by the PUF are used to encode on response bit. A nonce is transmitted from the server to the device, and the device uses the bits in the nonce to direct its encoding operation). A helper data bitstring is constructed and transmitted to the server that allows the server to reconstruct the nonce, bit-by-bit, in a reliable fashion using XMR. If the nonce reconstructed from the helper data bitstring sent by the device matches the nonce sent earlier to the device, then authentication succeeds.

PUF challenges are stored on the device at manufacturing time and do not need to be transmitted, saving lots of transmitted information. Specifically, during enrollment, challenges are stored on the device in a non-volatile memory so that no challenges need to be transmitted during authentication. Instead the nonce is used to create diversity in the authentication bitstrings (which is the helper data bitstring mentioned above) from one authentication to the next.

Authentication can be accomplished by having the server send an 8-byte nonce to the device and then the device respond with a 10-byte helper data bitstring response. Therefore PUF-based strong authentication is accomplished using as few as 18-bytes of transmitted data. The same process can be used in reverse to allow the device to authenticate the server (mutual authentication is possible).

Figure 1:
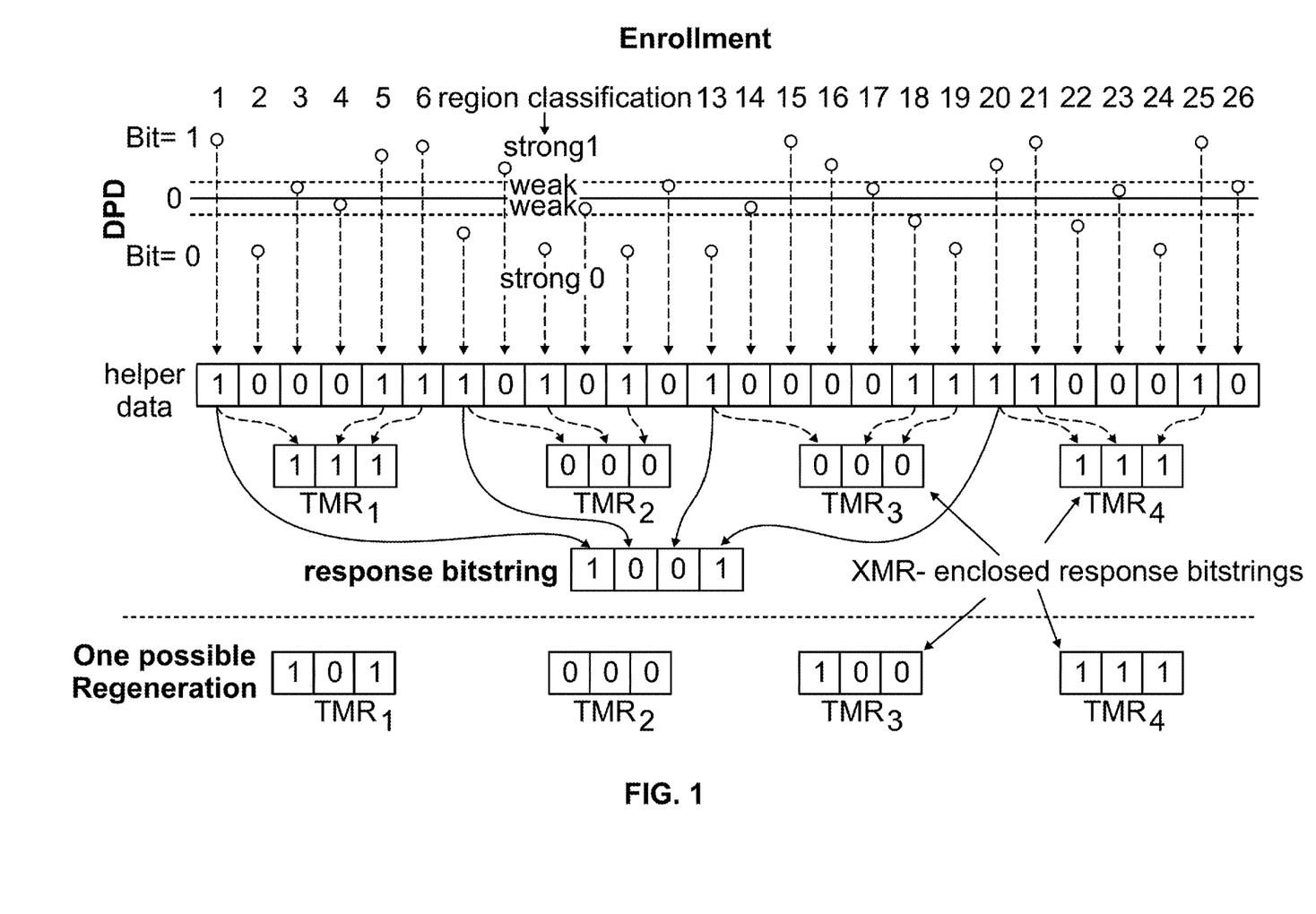
FIG. 1 illustrates a block diagram of XMR showing response bitstring generation using First Strong Bit (FSB) mode during enrollment (top) and regeneration (bottom). according to an embodiment of the invention.

Although any contemplated PUF can be used with the invention, the Shift-Register PUF (SRP) is used for purposes of this application. The SRP PUF leverages variations in path delays as a source of entropy. The path delays are measured on the FPGA using a high resolution on-chip time-to-digital-converter (TDC). The TDC produces digitized timing values at a resolution of approx. 20 ps. The digitized path delays (DPD) are referred to as PUF soft data. Two algorithms, called thresholding and XMR, are used to process the DPD soft data into keys and bitstrings. A set of DPD soft data values measured from a chip's PUF are shown in FIG. 1 to illustrate thresholding and XMR. XMR has two modes of operation, first strong bit (FSB) mode and secure key encoding (SKE) mode. The annotations in FIG. 1 illustrate the FSB mode of operation during enrollment. The output of KEK FSB mode is a response bitstring shown along the bottom of FIG. 1. The algorithm used to generate the response bitstring is given as follows.

A user-specified threshold is given as input to the KEK algorithm. The threshold is used to partition the DPD into strong and weak bit classes. The two horizontal dotted lines in FIG. 1 bound the 0 line and represent the threshold. The DPD that appear within the threshold region, labeled as weak in FIG. 1, are close to the 0 line and therefore have a high probability of producing bit flip errors. When these paths are measured again during bitstring regeneration, a small amount of noise can move these weak DPD to the opposite side of the 0 line, i.e., the side opposite of that which occurred during enrollment, resulting in a bit flip error. Weak DPD are excluded from the bitstring generation process by labeling them with a 0 in the helper data bitstring. Strong DPD, on the other hand, are located above the upper threshold or below the lower threshold, and are labeled with a 1 in the helper data bitstring. Thresholding improves the reliability of the bitstring regeneration process by creating a buffer against environmental disturbances, such as power supply noise or temperature changes.

The XMR algorithm adds a second layer of resiliency to the response bitstring regeneration process. The annotations in FIG. 1 show the response bitstring generated using TMR (triple modular redundancy), although any odd number is suitable for the XMR redundancy scheme with higher levels, e.g. 5MR, providing higher levels of protection against bit flip errors. The underlying principle of TMR is the use of 3 consecutive strong bits to encode one response bit. The FSB mode of the XMR algorithm scans the DPD from left to right searching for the first strong bit indicated by the helper data bitstring. For example, from FIG. 1, the leftmost DPD produces a strong 1. A 1 is added to both the response bitstring and the $TMR_1$ block of bits (which are shown for illustration purposes only). The algorithm continues to scan the DPD searching for two more instances of strong 1s, skipping strong 0s and DPD labeled weak. Bits in the helper data bitstring corresponding to strong 0s are changed from 1 to 0 during this scan. Once three strong is are located, the response bit is considered fully encoded and the algorithm searches for the next strong bit of either value to represent the second response bit. This occurs at position 7 where a strong 0 is found and the process repeats.

Regeneration reverses the process associated with the helper data bitstring, which is written during enrollment but is read during regeneration. The 1s in the helper data bitstring indicate which DPD to use to construct the $TMR_x$ sequences. A response bit is generated from each $TMR_x$ sequence using majority vote among the three $TMR_x$, which allows any single $TMR_x$ bit to flip while still enabling the correct response bit to be generated. Therefore, TMR adds resiliency to the response bitstring regeneration process. The regeneration process is shown along the bottom of FIG. 1.

Figure 2:
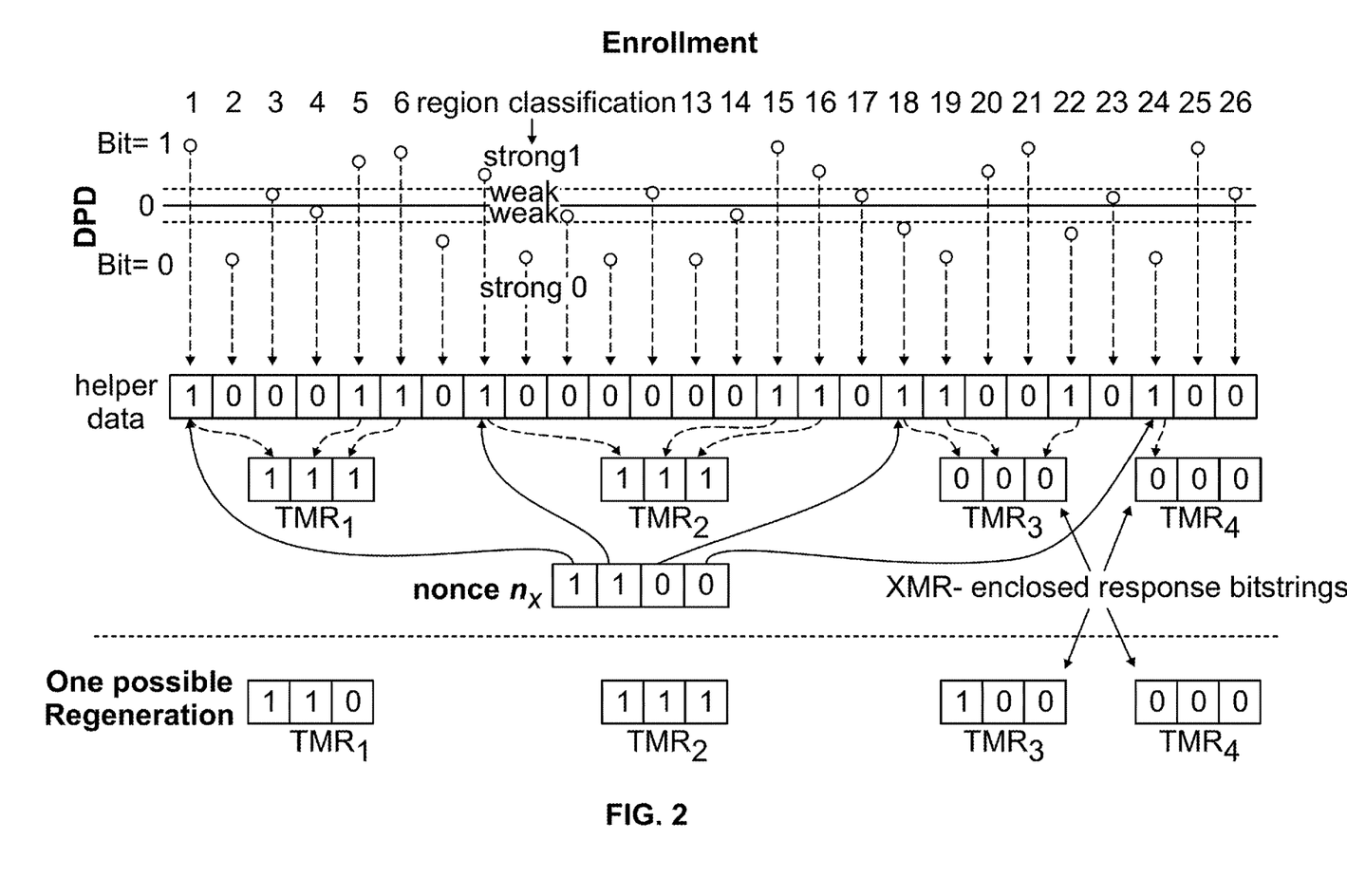
FIG. 2 illustrates a block diagram of XMR showing nonce encoding using Secure Key Encoding (SKE) mode during enrollment (top) and regeneration (bottom).

The secure key encoding (SKE) mode of KEK is identical except for one fundamental difference. Unlike FSB mode which generates a response bitstring and a helper data bitstring as output, SKE mode takes a response bitstring as input and encodes the helper data bitstring needed to reproduce it. The response bitstring for SKE is typically a randomly generated bitstring, i.e., a nonce. The enrollment operation carried out by SKE is graphically depicted in FIG. 2 using the same DPD data set given above in FIG. 1. A 4-bit portion of the nonce $n_x$ is shown along the bottom of the figure and represents the bit string that SKE will encode in the helper data bitstring. SKE processes the $n_x$ bits one bit at-a-time, starting with the left-most '1' bit. Similar to FSB mode, SKE scans the DPD left-to-right searching for a strong bit match to the nonce bit. As shown by FIG. 2, this constraint is met using the leftmost strong 1. Two additional strong 1s are found at positions 5 and 6, which completes the encoding of the first nonce bit. The second nonce bit is then selected and the process repeats as illustrated in FIG. 2.

Similar to FSB mode, regeneration in SKE reads the helper data bitstring and uses it to reproduce the response bitstring, i.e., the nonce. Majority voting is used to determine the final response bits by counting the number of 0 and 1 bits in each $TMR_x$ sequence and using the majority as the response bit. The regeneration process is shown along the bottom of FIG. 2.

The encoding of the 4th nonce bit is incomplete in FIG. 2 and requires additional DPD (not shown). In contrast, FSB mode successfully generates 4 response bits using the same DPD data set. FSB mode is 'opportunistic' and optimally enables the maximum size response bitstring to be generated while SKE mode skips additional strong bits that could be used but are a mismatch to the current nonce bit. However, SKE mode reveals only partial information about the underlying PUF response in cases where the nonce $n_x$ is transmitted in the open between a server and device during authentication. Furthermore, the thresholding scheme also obscures the underlying PUF response where DPD close to the threshold lines can be reclassified from strong to weak and vice versa during successive enrollments using the same challenge. These features of FSB mode are beneficial for authentication as a means of increasing the resistance of the PUF to model-building attacks.

Figure 3:
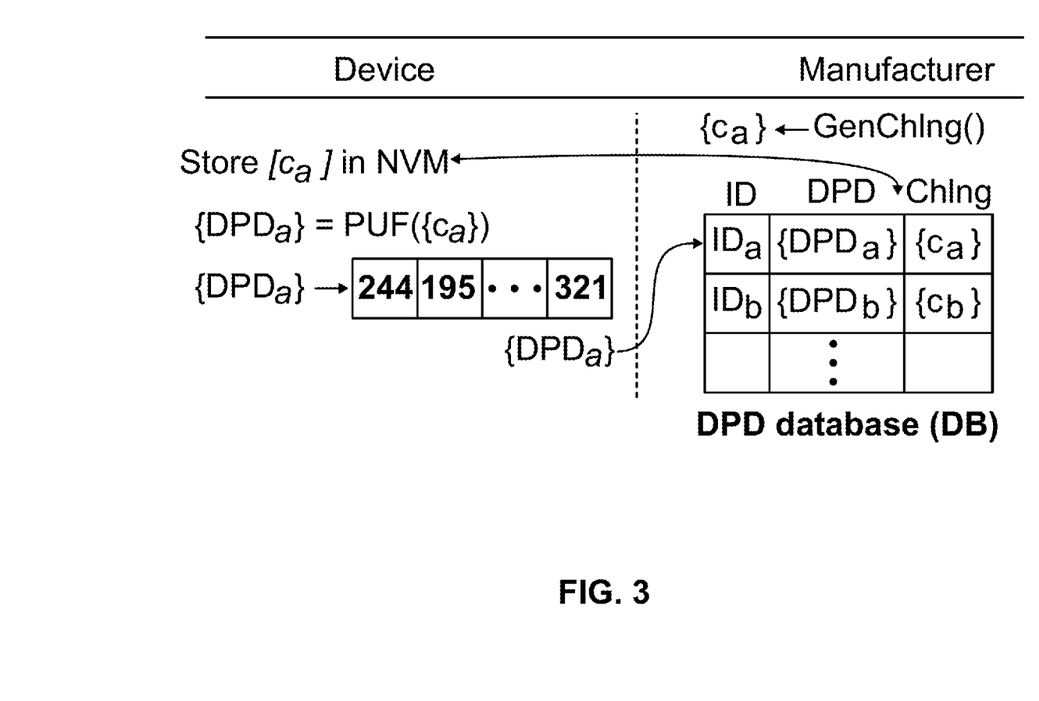
FIG. 3 illustrates a block diagram of a provisioning process according to an embodiment of the invention.

The provisioning process for the protocol according to the invention is shown in FIG. 3. A set of challenges represented by $\{c_a\}$, $\{c_b\}$, etc. are derived in advance with cardinality large enough to satisfy authentication requests for several years. Although the set of challenges for each device includes unique elements, there is a subset that is common in the challenge sets of all devices. The common challenges are used in the privacy-preserving device authentication component of the protocol, while the unique elements are used for verifier authentication and session key generation discussed below. The manufacturer applies the challenges to each device and the generated digitized path delays (DPD) are stored in the DPD database along with the challenge and device ID. The DPD database is transferred securely to the verifier, which will use it to interact with the devices. The DPD stored in the database represent the shared secrets that enable secure authentication and encryption operations and must be kept secure.

Figure 4:
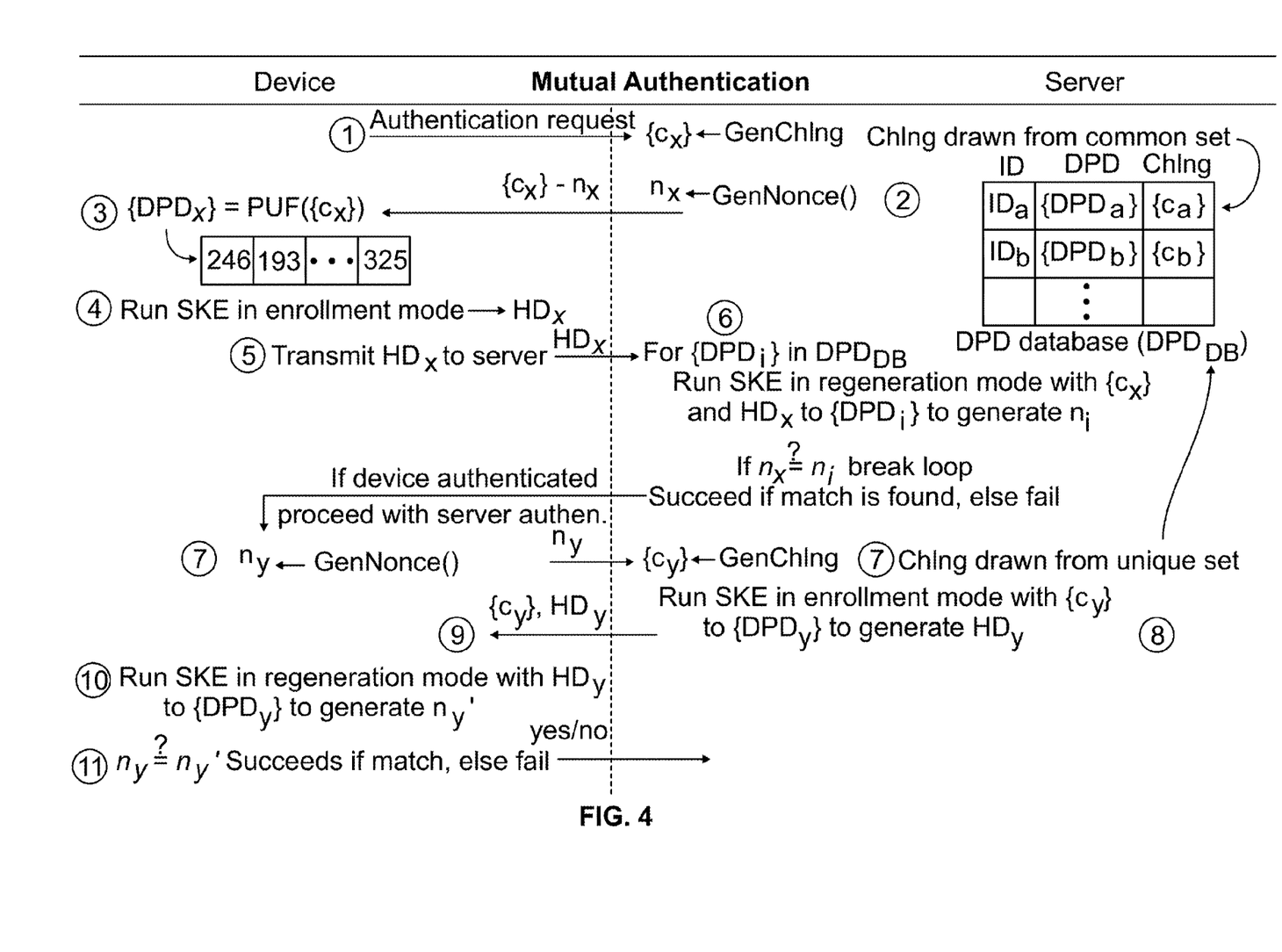
FIG. 4 illustrates a block diagram of a privacy-preserving mutual authentication protocol according to one embodiment of the invention.

The message exchange diagram for the privacy-preserving mutual authentication scheme is shown in FIG. 4. The authentication scheme comprises a database search operation to enable authentication to be carried out privately, and without the need for the device to first identify itself by transmitting its $ID_x$ and a verifier authentication component is used.

The protocol consists of 11 steps as annotated in the FIG. 4. Step 1 involves a device requesting authentication to a server (verifier). In step 2, the server draws a random set of challenges from the common pool discussed above, i.e., a subset of challenges that have been applied to all devices.

The server also generates a nonce $n_x$, for example nonces of size 128 and 256 bits, however any size is contemplated. The nonce can be extended to larger sizes as needed for increasing the degree of distinguishability between devices (an analysis is presented in the next section for illustrating this concept). The challenge $\{c_x\}$ and nonce $n_x$ are transmitted to the device. The device applies $\{c_x\}$ to its PUF in step 3 to generate a set of $\{DPD_x\}$ which are then processed into a helper data bitstring $HD_x$ using SKE mode of KEK algorithm in enrollment mode in step 4, as shown by the example in FIG. 2. The device transmits the helper data bitstring $HD_x$ to the server in step 5. Note that the device generated $\{DPD_x\}$ are slightly different than those stored in the database during provisioning (see FIG. 3). Measurement noise as well as changes in the temperature and supply voltage introduce small differences in the DPD when they are regenerated.

In step 6, the server searches the $DPD_{DB}$ for a match to $n_x$. For each database entry the $\{DPD_i\}$ corresponding to the challenge $\{c_x\}$ are read out and processed by running SKE mode in regeneration mode to generate a $n_i$. If the number of mismatching bits in the $n_i$ is less than a threshold, the search terminates and authentication succeeds. Assuming authentication succeeds, step 7 is executed, which represents the first step in the verifier authentication process. The exact same process is carried out except the database search operation is omitted and the verifier carries out SKE enrollment while the device carries out SKE regeneration. If the nonce $n_y'$ generated during regeneration has fewer than threshold mismatches with $n_y$, the device successfully authenticates the server.

Figure 5:
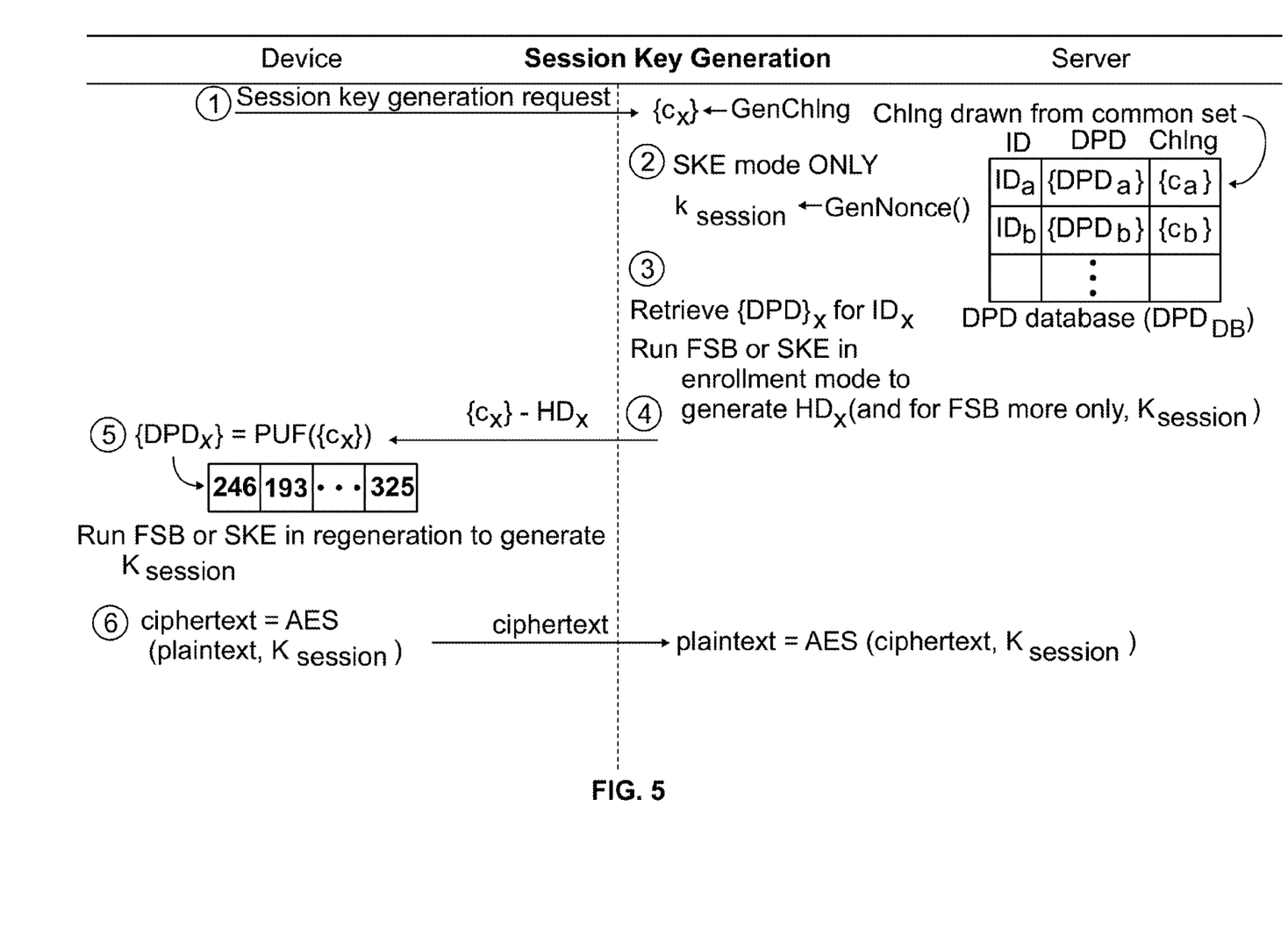
FIG. 5 illustrates a block diagram of a key-encryption-key (KEK) Session Key generation protocol using First Strong Bit (FSB) or Secure Key Encoding (SKE) mode.

Ephemeral session key can be implemented using either FSB or SKE KEK key modes as shown by the protocol illustrated in FIG. 5. First, the device makes a session key generation request to the server. Note that authentication has already occurred so the server knows the $ID_x$ of the device. The server then selects a challenge $c_x$ from the unique stored in the DPD database for that device. The server generates a nonce that will serve as the session key ($K_{session}$), for SKE mode only. The server retrieves the digitized path delays ($DPD_x$) stored in the database and runs FSB or SKE in enrollment mode to generate the helper data $HD_x$, and for FSB mode only, the response bitstring that will serve as $K_{session}$. The server transmits and $HD_x$ to the device. The device applies the challenges to the PUF to generate its copy of the digitized path delays, $DPD_x$, and then runs FSB or SKE in regeneration mode to generate the session key, $K_{session}$. The device and server exchange encrypted messages.

Unlike the ephemeral bitstrings generated by the authentication and session key protocols, KEK long-lived key (LLK) generation enables a device to reproduce the same key over a long period of time. The KEK key can be used to encrypt second stage boot loaders and other ancillary data that is stored and retrieved from an NVM.

The provisioning process shown in FIG. 3 can also be used to boot strap LLK mode. Here, the manufacturing facility generates a small, distinct set of challenges $\{c_z\}$ that are transmitted to the device. The device then applies the challenges to the PUF to generate a set of $\{DPD_z\}$, which are then be processed into a LLK using FSB and SKE modes (see FIG. 1 and FIG. 2), respectively. The helper data bitstring is stored along with the challenges in a non-secure NVM. During boot or while participating in other types of security functions that require the KEK key or a key derived from it, the device reads the helper data and challenges and runs the KEK FSB or SKE algorithms in regeneration mode.

Note that the provisioning process in FIG. 3 also shows the manufacturing facility recording the $\{DPD\}$ in a secure database. This would only be done in security protocols that require server verifiable bitstrings or session keys to be derived from the KEK key, and would otherwise be omitted.

The privacy-preserving device authentication method according to the invention critically depends on the uniqueness statistical property of the PUF. Uniqueness is typically measured using interchip hamming distance by comparing the response bitstrings generated by the PUFs from different chips using the same challenge. The ideal value for uniqueness is 50%, which indicates that the response bitstrings from any two arbitrary PUFs match on half of the bits and mismatch on the other half. The database search carried out by the device authentication method in FIG. 4 implicitly measures uniqueness because it too counts the number of matching and mismatching bits under the same conditions during the database search. Therefore, the results presented are from an application of the KEK SKE algorithm in support of the uniqueness statistical property of the PUF.

The authentication method of the invention is implemented according to one embodiment using four FPGAs repeatedly for a total of 3000 iterations. For each authentication, the SKE technique must distinguish the correct device from the set of 160 FPGAs whose provisioning data is stored in the database. In order to evaluate the ability of SKE to distinguish between devices, the number of mismatching bits in the response bitstrings generated during each authentication operation are counted.

Therefore, a total of approximately 3,000*160=480,000 mismatching counts are computed. The redundant bits created by the XMR redundancy scheme are included in the mismatching bit counts. The parameters used are 128-bit nonces and 5MR. Given the 5MR generates 5 strong bits for each response bit, the total number of bits inspected in each XMR-encoded response bitstring 5*128=640 bits.

Figure 6:
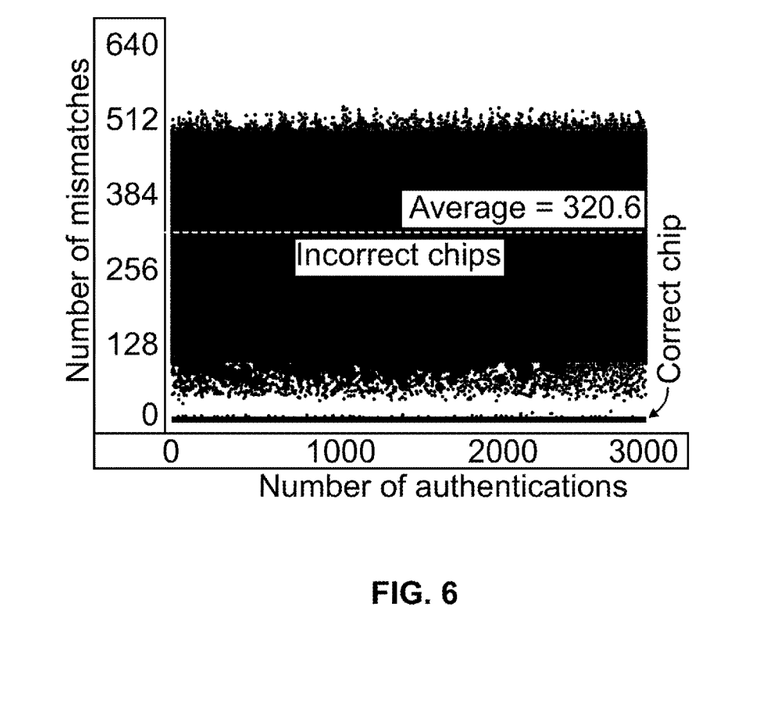
FIG. 6 illustrates a graph of a number of mismatches and a number of authentications of device authentication using 4 Field Programmable Gate Arrays (FPGAs) and a database of 160 enrollment data sets and 128-bit nonces.

The results are shown in FIG. 6 with the authentication operations plotted along the x-axis and the number of mismatches in 640-bit XMR-encoded response bitstring plotted along the y-axis. The points on the curve shown along the bottom of the figure give the number of mismatches for the correct (authentic) chip while the block of points in the center portion of the figure give the number of mismatches associated with the 159 remaining devices from the database. The non-zero values associated with the authentic devices correspond to bit flips that occur during regeneration.

Figure 7:
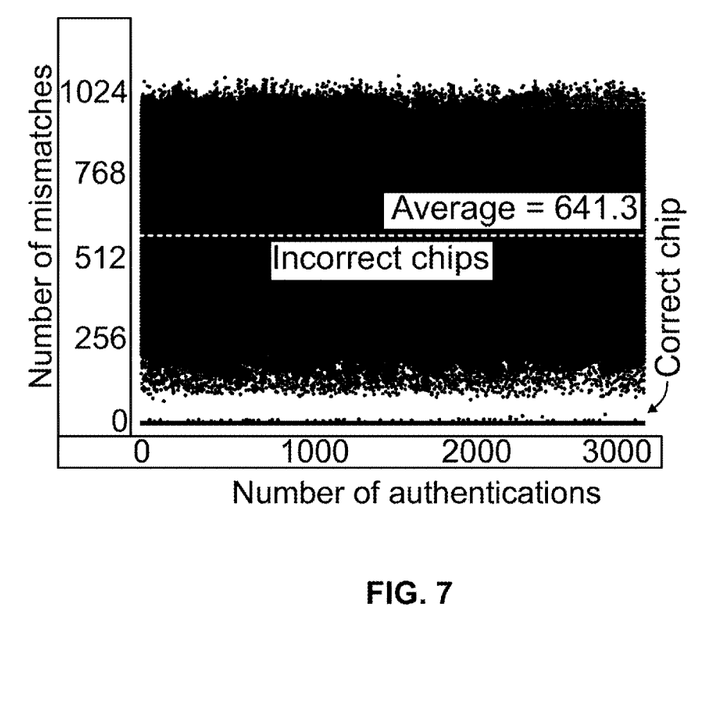
FIG. 7 illustrates a graph of a number of mismatches and a number of authentications of device authentication using 4 Field Programmable Gate Arrays (FPGAs) and a database of 160 enrollment data sets and 256-bit nonces.

It should be noted that the authentic devices are able to reproduce the response bitstring exactly in every authentication by virtue of the majority voting scheme so the bit flips that occurred were corrected in every authentication. The region between the black and red curves represents the margin between authentic and non-authentic chips. The smallest delta measured is 20 bits with most margins at least 40 bits in size. The minimum margin increases to approximately 50 bits when 256-bit nonces are used, with most margins at least 70 bits in size as shown in FIG. 7.

Although HELP is described above as implemented only on FPGAs, which are not suitable for low cost IoT applications, it is possible to build HELP onto a LoRa specific device or dedicated ASIC, making the invention applicable to a wider range of applications, i.e., beyond medical and defense applications that can afford the cost of an FPGA.

Each of the authentication protocols has different implementation requirements. For protocols that leverage cryptographic primitives, a key must be installed into the device during manufacturing. Common NVM storage mechanisms include flash and battery-backed RAM. The device specific stored key must be recorded during enrollment in a secure database to enable fielded authentication. Alternatively, stored challenges can be eliminated and instead challenges received at the onset of authentication from the server.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A method for authenticating devices, the method comprising the steps of:
    during an enrollment phase:
        generating by a server challenges and storing the challenges in a database;
        transmitting the challenges to a device;
        using by the device the challenges to obtain digitized timing data;
        transmitting from the device to the server the digitized timing data;
        storing by the server the digitized timing data in the database;
    during an authentication phase:
        selecting challenges by the server from the database and generating a nonce;
        transmitting by the server to the device the challenges and the nonce;
        applying by the device the challenges to a physically unclonable function (PUF) to obtain device timing data;
        encoding by the device the nonce and generating by the device a helper data bitstring using the device timing data;
        transmitting by the device to the server the helper data bitstring which encodes the nonce;
        searching by the server for a match to the nonce by retrieving from the database the digitized timing data and decoding the helper data bitstring; and
        authenticating the device.

2. The method of claim 1, wherein encoding further comprises: (1) parsing the device timing data, (2) searching for a match to bits of the nonce, one bit at a time, and (3) continuing the searching step until the helper data bitstring is exhausted.

3. The method of claim 2, wherein searching by the device further comprises not selecting weak bits and selecting an odd number of bits greater than or equal to a number bits with a same value, and that also match a nonce bit.

4. The method of claim 3, wherein the number of bits is three consecutive strong bits.

5. The method of claim 1, wherein decoding further comprises: (1) using the helper data bitstring to select device timing data from the database, (2) constructing a nonce using the device generated helper data bitstring and the selected device timing data from the database, and (3) counting a number of matching bits in the constructed nonce with those in the original nonce generated by the server.

6. The method of claim 5, wherein the nonce is constructed using majority vote on sets of consecutive bits with odd cardinality and greater than or equal to 3.

7. The method of claim 5, wherein the device is authenticated if the number of mismatching nonce bits is less than a threshold.

8. The method of claim 1 performed in a resource constrained environment.

9. The method of claim 8, wherein the resource constrained environment is a low-power wide-area network.

10. A method for authenticating servers, the method comprising the steps of:
  during an authentication phase:
    generating by the device a nonce;
    transmitting by the device the nonce to a server;
    selecting by the server challenges from a database;
    generating by the server a helper data bitstring using device timing data retrieved from the database that encodes the nonce;
    transmitting by the server challenges and the helper data bitstring to the device;
    applying by the device the challenges to a physically unclonable function (PUF) to obtain reproduced device timing data;
    decoding by the device the helper data bitstring to generate a nonce;
    comparing the generated nonce with the nonce sent by the device to the server; and
    authenticating the server if the number of mismatching bits in the nonces is less than a threshold.

11. The method of claim 10, wherein encoding further comprises: (1) parsing the device timing data from the database, (2) searching for a match to bits of the nonce, one bit at a time, and (3) continuing the searching step until the helper data bitstring fully encodes the nonce.

12. The method of claim 11, wherein the searching involves not selecting weak bits and selecting an odd number of bits greater than or equal to a number of bits with a same value, and that also match a nonce bit.

13. The method of claim 12, wherein the number of bits is three consecutive strong bits.

14. The method of claim 10, wherein decoding further comprises: (1) using the helper data bitstring to select device generated timing data, (2) constructing a nonce from the selected device timing data, and (3) counting a number of matching bits in the constructed nonce with those in the original nonce.

15. The method of claim 14, wherein the nonce is constructed using majority vote on sets of consecutive bits with odd cardinality and greater than or equal to 3.

16. The method of claim 14, wherein the device is authenticated if the number of mismatching nonce bits is less than a threshold.

17. The method of claim 14, wherein (1) the server generates a nonce and encodes it by generating a helper data bitstring, (2) the server transmits the helper data bitstring to the device, (3) the device decodes the nonce using the server generated helper data bitstring, and (4) the device and server now share a secret (the nonce) that can be used as a session key.

18. A method for generating a long-lived key-encryption-key (KEK) by a device, the method comprising the steps of:
  during an enrollment phase:
    generating by a server challenges and transmitting them to a device;
    using by the device the challenges to obtain digitized timing data;
    generating by the device a KEK or a nonce that will serve as the KEK,
    wherein generating the KEK or the nonce further comprises: (1) applying by the device the challenges to a physically unclonable function (PUF) to obtain device timing data, (2) generating KEK bits, one at a time, by not selecting weak bits and selecting an odd number of bits greater than or equal to three consecutive strong bits with the same value, (3) simultaneously generating a helper data bitstring that records results of the selecting process, and (4) storing the challenges and the help data bitstring in a non-volatile-memory (NVM)
  during an regeneration phase:
    reading by the device the challenges and helper data bitstring from the NVM;
    applying by the device the challenges to a physically unclonable function (PUF) of the device to obtain device reproduced timing data;
    generating by the device the KEK wherein the KEK regeneration step further comprises: (1) using the device helper data bitstring to select timing values from the reproduced device timing values, (2) constructing the bitstring from the selected timing values using majority vote on sets of consecutive bits with odd cardinality and greater than or equal to three, (3) using the constructed bitstring as the KEK.

19. The method of claim 18 further comprising using as the KEK bit, a value of a first strong bit in a sequence.

20. The method of claim 18, wherein the odd number of bits selected also match a bit of the nonce.

* * * * *